J. DUROSS

May 17, 1932. PAGING SYSTEM Re. 18,466

Original Filed Nov. 29, 1924 3 Sheets-Sheet 1

Witness:

Alfred H. McGlinchey

Inventor:

John Duross

By his attorneys

Van Santvoord & Hildreth

J. DUROSS

May 17, 1932. PAGING SYSTEM Re. 18,466

Original Filed Nov. 29, 1924 3 Sheets-Sheet 2

Witness:

Alfred H. McGlinchey

Inventor:

John Duross

By his attorneys

Van Santvoord, Fairbanks & Bray

J. DUROSS

May 17, 1932. PAGING SYSTEM Re. 18,466

Original Filed Nov. 29, 1924 3 Sheets-Sheet 3

Witness:

Alfred H. McGlinchey.

Inventor:

John Duross

By his attorneys

Van Santvoord Fish Hildreth & Clay

Reissued May 17, 1932 Re. 18,466

UNITED STATES PATENT OFFICE

JOHN DUROSS, OF ROXBURY, MASSACHUSETTS, ASSIGNOR TO THE HOLTZER-CABOT ELECTRIC COMPANY, OF ROXBURY, MASSACHUSETTS, A CORPORATION OF MASSACHUSETTS

PAGING SYSTEM

Original No. 1,719,336, dated July 2, 1929, Serial No. 752,877, filed November 29, 1924. Application for reissue filed March 9, 1931. Serial No. 521,319.

The present invention relates to an improvement in paging systems.

Paging systems for calling a doctor visiting a hospital to the telephone have been in use for some time. A simple apparatus of this type comprises a calling unit and an annunciator, either audible or visible, which responds to the number indicated by the calling unit. It is a simple matter to install a series of annunciators of ordinary form where each doctor to be called is given a single unit number, but the expense of installing an apparatus of this general type, where the number of doctors visiting the hospital is large and the building is of great size, has been very heavy.

The object of the present invention is to simplify the operation of paging apparatus, and to produce one capable of paging a large number of different persons, and paging a number of them at one time. To this end the present invention consists in the paging apparatus hereinafter described and particularly defined in the claims.

Figure 1:
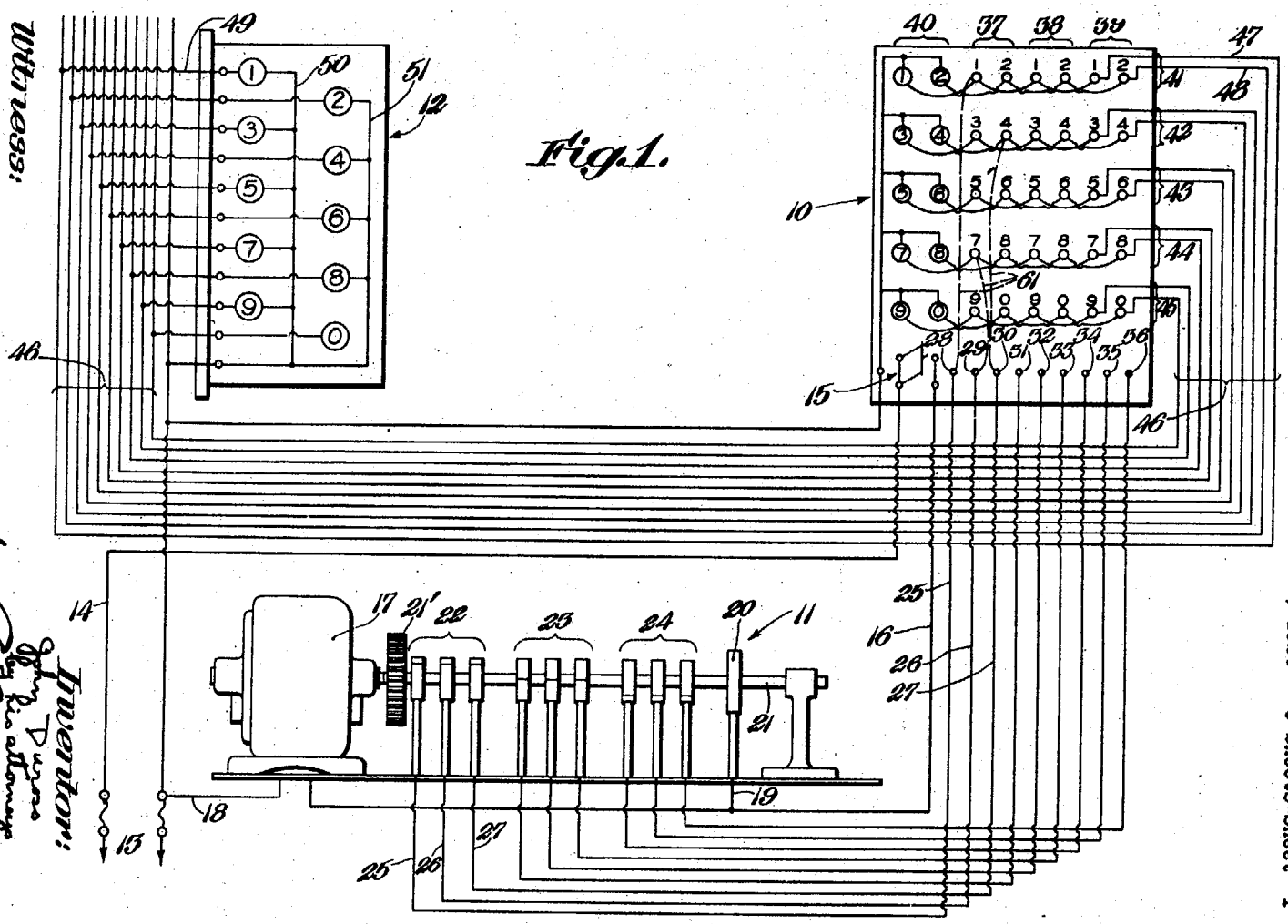
Figure 2:
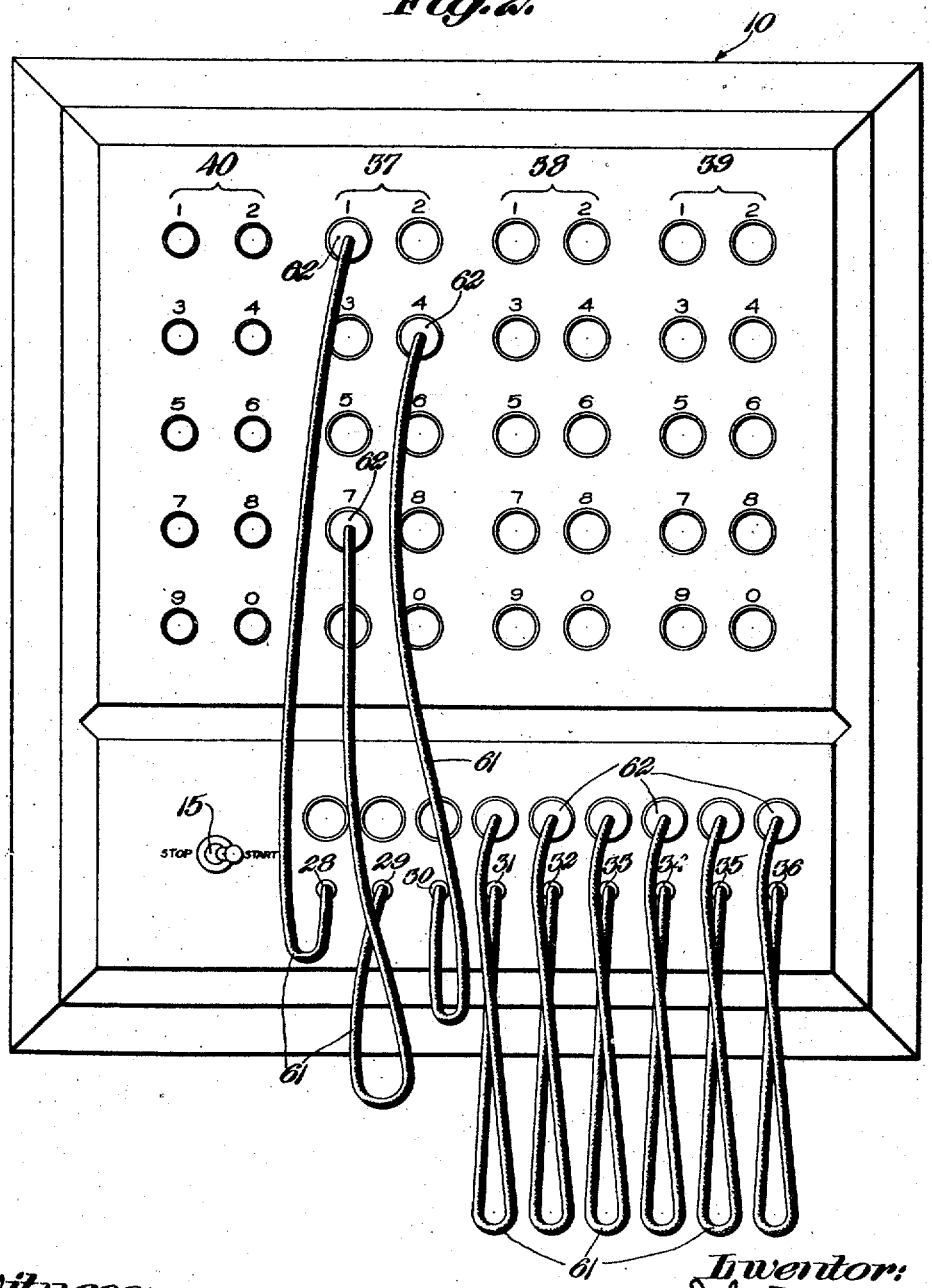
Figure 3:
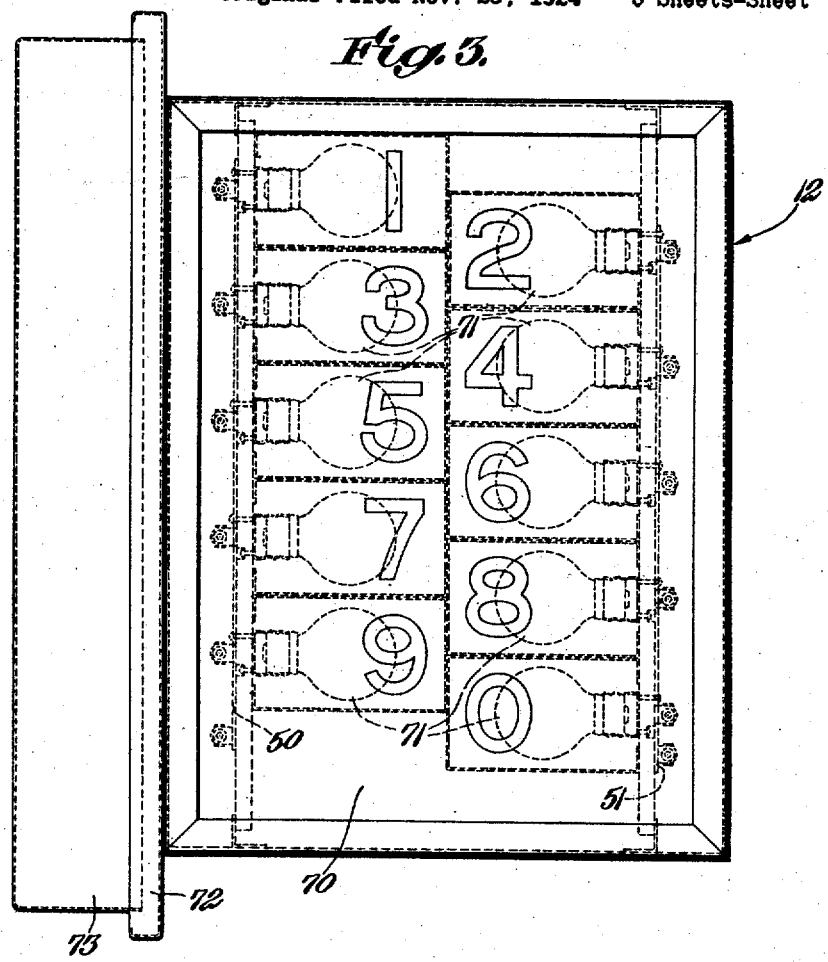
Figure 4:
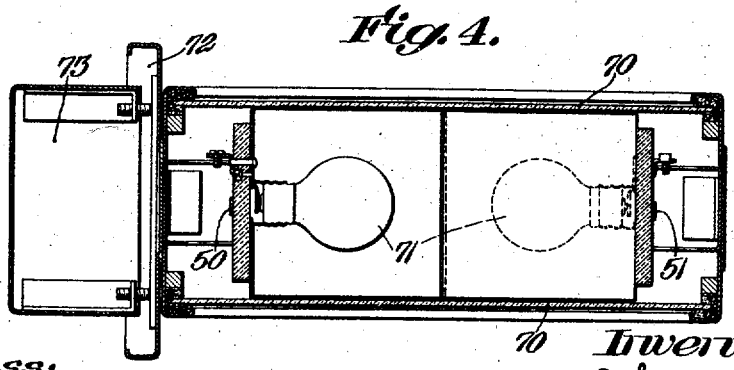

In the accompanying drawings illustrating the preferred form of the invention, Fig. 1 is a schematic diagram illustrating the calling unit, one of the annunciators and the flasher unit, together with the wiring therefor; Fig. 2 illustrates the calling unit; and Figs. 3 and 4 illustrate the annunciator unit, the former figure being an elevation, and the latter a horizontal section.

The illustrated embodiment of the invention is described as follows: Referring first to the schematic drawings, Fig. 1, the calling unit 10 is in charge of the operator, usually the telephone operator of the hospital, the flasher unit 11 connected therewith for use in throwing first one signal and then another on to the line wires, and the annunicator 12 is one of as many annunicators as it may be desired to install throughout the hospital buildings.

The description of the apparatus is as follows: The current supply is provided at 13. A wire 14 from one terminal leads to the master control switch 15, or tumbler switch, by which the operator, after making the proper connection, throws the flasher into operation. From the tumbler switch 15 the wire 16 leads to the flasher motor 17, and thence to the wire 18 to the other of the two terminals 13. A tap 19 from the wire 16 leads to the continuous contact 20 on the flasher unit shaft 21, which is conveniently rotated from the motor through a reduction gearing 21′. The operator, by closing the tumbler switch, sets the flasher unit in operation. This unit is provided, in the illustrated embodiment, with three series of flasher connections 22, 23 and 24, which are timed successively to flash numbers on the annunciator. The connection 22 provides three connections through the wires 25, 26 and 27 with the binding posts 28, 29 and 30, respectively. Similarly, the connections 23 provide current for the binding posts 31, 32 and 33, and the flasher connections 24 provide current for the binding posts 34, 35 and 36 of the calling unit. The posts 28 to 36, inclusive, are provided with calling plugs connected by calling cords by which current is conducted to jacks on the board. Thus, in the drawings, Fig. 1, the post 28 is connected to number 1 of the series of jacks indicated by the bracket 37. The posts 29 and 30 are connected by the calling cord with jacks 7 and 4 of the series 37. If only one doctor were being called, his number with this arrangement of cords would be 147. The posts 31, 32 and 33 provide current for three numbers on the series of jacks 38, and the posts 34, 35 and 36 provide current for the series of jacks 39. With each jack there is a corresponding bull's eye in the bull's eye series 40. Thus, the operator sets up the call as follows: Taking the plug from 28, it is carried to jack 1 in series 37; the plug from the post 29 is inserted in jack 7, and the plug from post 30 is inserted in jack 4. Then the operator closes the master control switch or tumbler switch 15, the flasher unit starts, and at every revolution of the flasher unit 21 the number 147 appears upon the bull's eye series 40, thus checking the correctness of the call and enabling the operator to make visually certain of its correctness. In the top row 41 of plugs the characters 1 and 2 three times appear. In the second row 42 the characters 3 and 4 three times appear, and so on through the rows 43, 44 and 45. The current supplied by the flasher and the cords to the numbers in the several rows is conducted by the line wires indicated as a group by the character 46 to the several annunciators, and so on through the series. The series of jacks 37 are energized by the flasher connections 22, and the series of jacks 38 by the flasher connections 23, and the series of jacks 39 by flasher connections 24. These connections are arranged so that they do not overlap, and so that an interval exists between successive connections. Thus, simultaneously flasher connections 22 illuminate bull's eyes corresponding to 147, one doctor's call; flasher connections 23 succeed connections 22 and illuminate another doctor's call, and similarly flasher connections 24 energize a third doctor's call. These succeed each other, one after the other at regular intervals until the connection is removed by the operator. The line wires 46, as before stated, run to the several annunciators, and it will be observed that each line wire is connected with one of the numbers appearing upon the annunciator face. Thus, the line wire 47 coming from the row number 1 is connected through the connection 49 with the lamp 1 of the annunciator 12, and so with each of the several line wires.

Coming now to the annunciator, it is a simple affair consisting of a box containing indicating lamps. Each lamp illuminates a number. Thus, wire 47 illuminates the lamp for the number 1, and so on through the several numbers, the return connections being made by means of the wires 50 and 51 to the return wire or main supply 13. When number 147 is set up on the calling unit, and that number only is set up, the numbers 1, 4 and 7 of the annunciator are illuminated and extinguished, an interval occurs sufficient for the illumination of two other numbers by the other flasher connection not in use, and then the numbers 1, 4 and 7 are again illuminated at the annunciator. This number being known to the doctor and to attendants may be attracted to his attention and he will put himself in telephonic connection with the calling unit operator.

Passing now to a description of the specific construction of the calling unit, the box is an ordinary plugging member with several posts 28, 29, 30, 31, 32, 33, 34, 35 and 36 heretofore referred to, each provided with a cord 61 and a jack 62. The rows of jacks are connected as illustrated in the schematic diagram, Fig. 1. The bank of bull's eyes 40 are connected with the several jacks so that they are illuminated when the current is supplied to the jacks. The calls are set up first and then the tumbler switch 15 is thrown to start the flasher and cause the sending out of the signals.

The annunciator consists of a box having ground glass sides 70. Within the box are arranged a series of ten lamps 71. Each lamp is in a compartment by itself and illuminates a figure on the ground glass 70. These figures are arranged in generally vertical relation. To have each below the other would require too high a box, but by offsetting the 2 to a level between the 1 and 3, it is apparent that the number may be read downward. Thus, in the set-up illustrated, the numerals 1, 4 and 7 will be lighted when the signal is being given, and it will be read downward. The box is provided with a suitable base 72 by which it may be attached to the outlet box 73.

This arrangement of annunciator is of advantage in a place where a great many doctors or persons are required to be called, as the number of persons that may be identified by using not more than three figures is large. Certain numbers are not used. Thus 174 is not an available number. For example, the illumination of these figures on the annunciator would read 147. Therefore only such call numbers may be employed as have their digits in ascending order. Taking the numbers two at a time, the following would be available: 12, 13, 14, 15, 16, 17, 18, 19, 10, 23, 24, 25, 26, 27, 28, 29, 20, 34, 35, 36, 37, 38, 39, 30, 45, 46, etc.

It will be seen that the three sections of the calling unit provide separate and independent controls for the indicating lamps of the annunciator. At any given time three doctors' call numbers may be simultaneously set up on the calling unit to be periodically and successively flashed upon the screen of the annunciator. Any lesser number may also be used. If it were desired to modify the apparatus so as to flash successively a greater number of doctors' numbers upon the screen one after the other, this could be accomplished by an additional series of jacks without any change in the annunicators. The only change necessary to be made would be in adding flasher connections to the flasher unit, and to provide a new calling unit. But in practice it has been found that a calling of three persons at one time is sufficient for efficient discharge of the duty laid upon the system.

It will be noted that the wires 46 form individual local or annunicator connections, each of which includes one of the annunicator signals. The wires 25, 26, 27 constitute a set of call connections, there being three of such sets illustrated. The call connections are arranged for association with selected annunciator connections through the manually operated calling unit, and the several sets of call connections are energized in succession through the flasher unit.

Having thus described the invention, what is claimed is:

1. An electrical calling apparatus embodying an annunciator having a plurality of digits adapted to be made visible by electric lamps, a calling appliance having a plurality of sets of jacks, the jacks in each set being numbered to correspond with the indicating numbers of said annunciator and also having a similarly-numbered-and-arranged set of corroborative signal lamps, electrical connections to connect similarly numbered jacks of the several sets together and to similarly numbered lamps of the annunciator and the set of corroborative lamps, a flasher appliance embodying a driving motor and a plurality of sets of contacts, one set for each set of jacks, these sets of contacts being adapted as the motor runs to come into action successively, a set of manually-operable plugs for each set of jacks, and electrical connections from said flasher contacts to their corresponding plugs, whereby a plurality of calling numbers will be successively exhibited at the annunciator and simultaneously by the corroborative sets of lamps at the calling appliance.

2. An electrical calling apparatus embodying an annunciator having a plurality of separate electric lamps and an indicating digit associated with each lamp, a calling appliance embodying a plurality of sets of jacks, the jacks of each set being numbered to correspond with the indicating numbers of the annunciator, electrical connections to connect similarly numbered jacks together and to similarly numbered lamps, a plurality of manually-manipulated plugs for each set of jacks, a flasher embodying an electric motor having a driven shaft, said shaft having a plurality of sets of contacts, one set for each set of jacks, these sets of contacts being arranged to come into action successively as the shaft rotates, each set being associated with one of the sets of the aforesaid plugs, and electrical connections between the sets of contacts of the flasher and their corresponding plugs, whereby the series of called numbers set up on the calling appliance will be successively exhibited at the annunciator.

3. A paging system having, in combination, a set of annunciator devices, each representing a different signal, a call unit having a plurality of similar sets of manually controlled calling contact devices, each set thereof having contact devices for and corresponding to the separate annunciator devices, connections from the separate annunciator devices to the corresponding contact devices of the several sets, a flasher having a plurality of switching means, one for each set of contacts of the call unit, means for closing the flasher switching means successively, independent connections from the several flasher switching means to the call unit, and a source of energy connected at one side to all of the annunciator devices and at the other side to the flasher switching means, whereby a plurality of calls may be set up on the unit and successively exhibited on the set of annunciator devices.

In testimony whereof I have signed my name to this specification.

JOHN DUROSS.